United States Patent [19]

Gitlis

[11] Patent Number: 4,458,143

[45] Date of Patent: Jul. 3, 1984

[54] APPARATUS FOR DETERMINING THE AUTHENTICITY OF CURRENCY

[75] Inventor: Meir Gitlis, Givatayim, Israel

[73] Assignee: Nachshol Electronics Ltd., Moshav Bnei Atarot, Israel

[21] Appl. No.: 370,624

[22] Filed: Apr. 22, 1982

[30] Foreign Application Priority Data

Jun. 22, 1981 [IL] Israel ........................................ 63137

[51] Int. Cl.$^3$ ............................................. G11B 25/01

[52] U.S. Cl. .................................... 235/449; 235/472; 235/439; 235/493

[58] Field of Search ............... 235/379, 380, 381, 382, 235/383, 384, 385, 386, 436, 439, 446, 449, 454, 462, 468, 474, 475, 476, 485, 486, 487, 493

[56] References Cited

U.S. PATENT DOCUMENTS

| | | | |
|---|---|---|---|
| 3,701,886 | 10/1972 | Jones | 235/462 |
| 3,755,657 | 8/1973 | Kunz | 235/446 |
| 3,866,827 | 2/1975 | Obata et al. | 235/449 |
| 3,886,327 | 5/1975 | Dobosi | 235/475 |
| 4,107,540 | 8/1978 | Hillman | 250/566 |
| 4,109,146 | 8/1978 | Hillman | 250/227 |

FOREIGN PATENT DOCUMENTS

| | | | |
|---|---|---|---|
| 2241987 | 3/1973 | Fed. Rep. of Germany | 235/449 |
| 52-4215 | 1/1977 | Japan | 235/449 |

OTHER PUBLICATIONS

IBM Tech. Dis. Bul. vol. 22, No. 12, May 1980, p. 5299.

*Primary Examiner*—A. D. Pellinen
*Assistant Examiner*—Robert Lev
*Attorney, Agent, or Firm*—Browdy and Neimark

[57] ABSTRACT

Apparatus for determining the authenticity of banknotes including a housing configured for being held in a single hand; a magnetic ink sensing head movably mounted in the housing and providing an electrical output indicating the presence of magnetic material in the vicinity thereof during operation thereof in scanning a banknote; sensible output indication providing apparatus responsive to the electrical output of the sensing head; and ON-OFF switch apparatus operated by the relative positioning of the sensing head and the housing for operating the determining apparatus only when the magnetic ink sensing head is in a predetermined position relative to the housing characteristic of operation thereof. The housing may be configured to lie coplanar with the sensing head during operation thereof for determining the orientation thereof.

5 Claims, 5 Drawing Figures

APPARATUS FOR DETERMINING THE AUTHENTICITY OF CURRENCY

FIELD OF THE INVENTION

The present invention relates to counterfeit currency detection and more particularly to apparatus for detecting counterfeit currency by noting the presence or absence of magnetic ink in a currency sample being tested.

BACKGROUND OF THE INVENTION

Most currencies presently in use today employ magnetic ink in the printing of at least a portion of the currency. The use of such ink enables certain portions of the currency to be machine readable. For this reason, magnetic ink is often used for printing of the currency serial numbers.

Apparatus is known for detecting the magnetic ink in a currency sample for determining its authenticity. Such apparatus, as presently available, suffers from a number of disadvantages. A primary disadvantage is that the orientation of the magnetic sensing head must be maintained within a predetermined, relatively narrow range to provide detection.

A second difficulty is that the apparatus must be switched on by a separate switch and then switched off after use to preserve the power of the battery which powers the apparatus. This is inconvenient in practice and often results in premature battery wear.

SUMMARY OF THE INVENTION

The present invention provides improved apparatus for detecting magnetic ink presence in currency for determining the authenticity thereof. There is thus provided in accordance with an embodiment of the invention automatically actuable single hand held apparatus for detecting magnetic ink presence on printed web material comprising a housing, a magnetic ink sensing head movably mounted in the housing, output indication apparatus for indicating the presence of magnetic ink in the vicinity of the sensing head in response to an output from the head and switch means operated by depression of the magnetic ink sensing head relative to the housing for enabling operation of the apparatus.

Further in accordance with an embodiment of the invention there is provided apparatus for detecting magnetic ink presence on printed web material comprising a housing, a magnetic ink sensing head mounted in the housing, the magnetic sensing head and the housing being arranged such that during operation of the magnetic sensing head, a housing surface adjacent the magnetic sensing head is substantially coplanar therewith for defining the orientation of the sensing head in use.

Additionally in accordance with an embodiment of the present invention, both of the above-described features are embodied in a preferred embodiment of the present invention.

BRIEF DESCRIPTION OF THE DRAWINGS

The present invention will be more fully understood and appreciated from the following detailed description taken in conjunction with the drawings in which.

DETAILED DESCRIPTION OF THE INVENTION

Reference is now made to FIGS. 1A–1C and 2 which illustrate a preferred embodiment of apparatus for determining the authenticity of banknotes and other currency. As noted above, authentic currency is known to be printed wholly or partially using magnetic ink. Preferably the location of the magnetic ink areas on genuine currency should be known in advance by the user for most efficient usage of the present apparatus.

The apparatus of the present invention comprises a housing 10, typically formed of plastic and of a size which enables it to be held in the plam of a single hand with ease. Movably mounted in the housing is a magnetic ink detection head 12 which defines a magnetic ink detection surface 14. In use, detection surface 14 is moved across a banknote surface in a direction perpendicular to the longitudinal axis of detection surface 14. Thus the axis of scanning of the apparatus across the banknote surface is indicated by an arrow 16.

Figure 2:
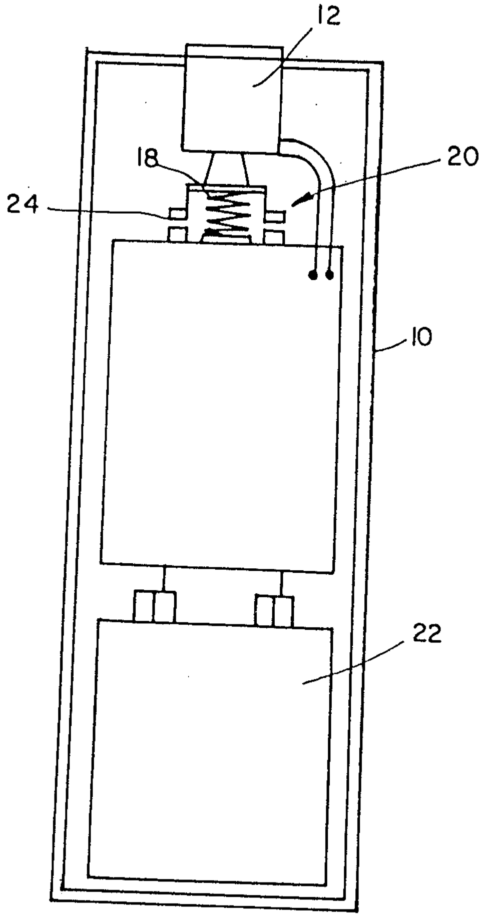
FIG. 2 is a sectional illustration of the apparatus of FIGS. 1A 1C.

As indicated in FIG. 2, magnetic ink detection head 12 is spring mounted with respect to housing 10, as by a spring 18. The spring mounting of detection head 12 also defines an ON-OFF contact switch 20 which is operative to close, thus connecting the apparatus to battery power, only when the detection head 12 is in a depressed orientation, indicating operation of the apparatus. Normally, while not in use, the ink detection head 12 is in an extended orientation, as shown, and the contact switch 20 is open, decoupling the battery 22 from the remainder of the apparatus, for preservation of the battery. It is a particular feature of the present invention that the battery is only coupled to the apparatus for powering thereof during actual operation of the device, thus providing automatic actuation thereof while preserving battery power.

A further particular feature of the present invention is provided by the configuration of the housing such that when the detection head 12 is depressed, it lies substantially coplanar with the housing, thereby defining the orientation of the head 12 when the apparatus is moved against a planar surface with the head 12 in contact therewith. It may readily be appreciated that the head 12 and the detection surface 14 are maintained in a generally parallel orientation with respect to such a planar surface and thus with respect to a banknote placed thereon for examination, while the apparatus is arranged generally normal to such surface.

Depression of the detection head is normally by an amount defined by the separation between the contacts 24 which is equal to the amount of protrusion between the head 12 and the housing 10, when the head is in its extended orientation.

Figure 3:
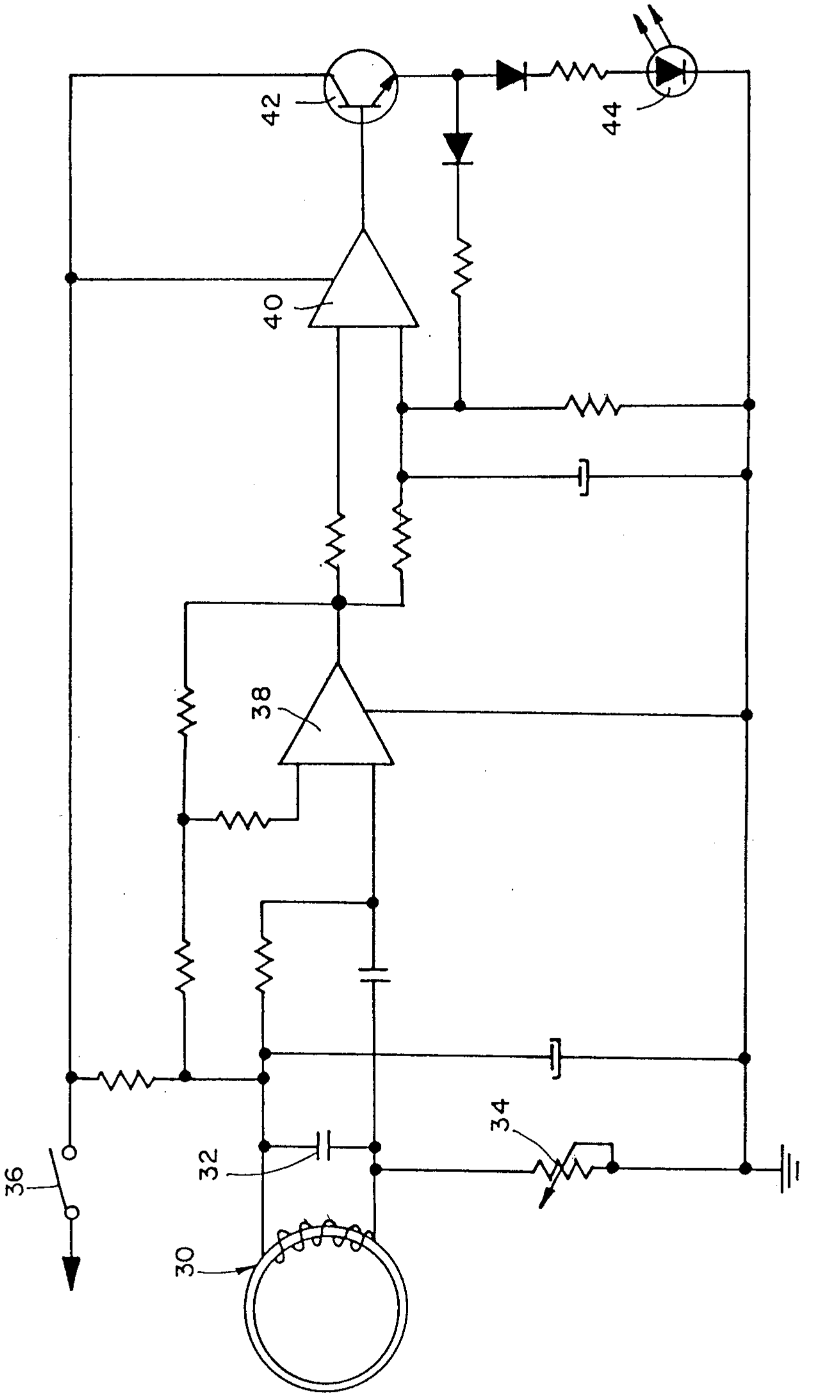
FIG. 3 is a circuit diagram illustration of the apparatus of FIGS. 1A–1C and 2.

Reference is now made to FIG. 3 which illustrates the electrical circuit diagram of the apparatus of the preferred embodiment of the invention described hereinabove. A magnetic induction coil 30 is coupled across a capacitor 32 and associated with a potentiometer 34 for determining the sensitivity thereof. A voltage source, such as a battery, 22 is coupled across an ON-OFF switch 36 which is embodied in contacts 24 operated by the magnetic detection head position, to the magnetic induction coil 30, which is embodied in detection surface 14, described hereinabove.

The output of the magnetic induction coil 30 is coupled to first and second series amplifiers 38 and 40 and thence to a transistor switch 42 which is operative to operate an indicator such as an LED or other audio and or visual alarm indicating device 44 for providing a sensible indication of the detection of magnetic ink above a predtermined threshold established by amplifiers 38 and 40 and their associated resistors and capacitors.

Figure 1C:
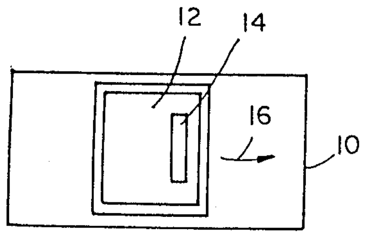
FIGS. 1A, 1B and 1C are outside plan, side and top views respectively of the apparatus of the present invention.
Figure 1A:
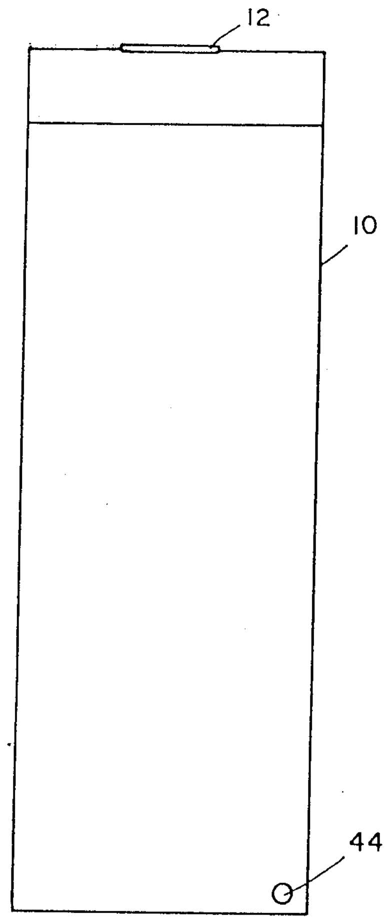
Figure 1B:
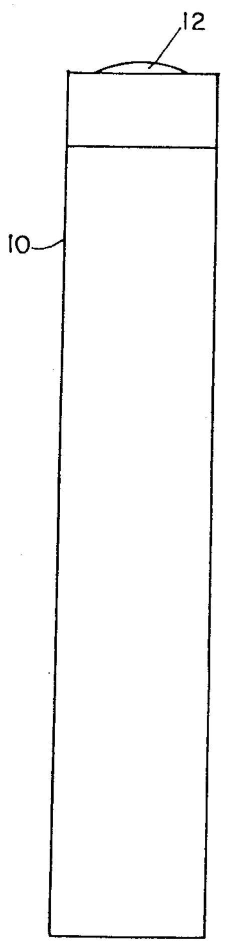

The alarm indicating device may be located on a surface of the housing 10 at any convenient location, as shown in FIG. 1A.

It will be apparent to persons skilled in the art that the present invention is not limited to what has been particularly shown and described hereinabove. Rather the scope of the present invention is defined only by the claims which follow:

I claim:

1. Self-contained apparatus for determining the authenticity of banknotes comprising:

a housing configured for being held in a single hand;

a magnetic ink sensing head retractably spring mounted in said housing and providing an electrical output indicating the presence of magnetic material in the vicinity thereof during operation thereof; and sensible output indication providing means operative to provide a sensible indication of magnetic ink presence on a banknote in response to the electrical output of said sensing head; and said housing being configured to define a money engagement surface lying coplanar with said magnetic ink sensing head when said sensing head is retracted during operation thereof thereby to define a desired orientation of said magnetic ink sensing had during operation thereof.

2. Apparatus according to claim 1 and wherein said magnetic ink sensing head is retractably mounted in said housing and also comprising:

ON-OFF switch means operated by the relative positioning of said sensing head and said housing for coupling said magnetic ink sensing head and said sensible output indication providing means to an electrical power source located within said housing for operating said apparatus only when said magnetic ink sensing head is in a predetermined retracted position relative to said housing characteristic of operation.

3. Apparatus according to claim 2 and wherein said magnetic ink sensing head is spring biased relative to said housing to normally adopt an extended orientation.

4. Apparatus according to claim 2 and wherein said sensible output indication providing means comprise an LED.

5. Apparatus according to claim 2 and wherein said sensible output indication providing means comprise an audio indicator.

* * * * *